United States Patent
Vorungati

(10) Patent No.: US 8,434,065 B2
(45) Date of Patent: Apr. 30, 2013

(54) METHOD FOR ENHANCING FUNCTIONALITY OF AN AUTOMATED TESTING TOOL

(75) Inventor: Venkata Subbarao Vorungati, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 842 days.

(21) Appl. No.: 12/372,938

(22) Filed: Feb. 18, 2009

(65) Prior Publication Data

US 2009/0150867 A1    Jun. 11, 2009

Related U.S. Application Data

(62) Division of application No. 10/446,337, filed on May 27, 2003, now Pat. No. 7,512,039.

(51) Int. Cl.
*G06F 9/44* (2006.01)
(52) U.S. Cl.
USPC ............ 717/124; 717/126; 717/128; 717/133

(58) Field of Classification Search ........................ None
See application file for complete search history.

(56) References Cited

U.S. PATENT DOCUMENTS 7,076,713 B1 *  7/2006  Hess ............................. 714/741

* cited by examiner

*Primary Examiner* — Isaac Tecklu
(74) *Attorney, Agent, or Firm* — Kilpatrick Townsend & Stockton LLP

(57) ABSTRACT

A method for enhancing functionality of an automated testing tool. Embodiments of the present invention provide for dynamically adjusting a date in an automated testing tool. System time in a system time format is adjusted according to a date offset. Embodiments of the present invention provide a method of formatting a date in an automated testing tool. System time in a system time format is accessed, wherein the system time comprises a current date and a current time. The date is formatted according to a predetermined date format. Embodiments of the present invention provide a method of regulating access to variables of an automated testing tool. An electronic document of the automated testing tool is populated with at least one variable and at least one value corresponding to the variable. In response to a request to access the variable, access to the variable and the value is provided.

12 Claims, 5 Drawing Sheets

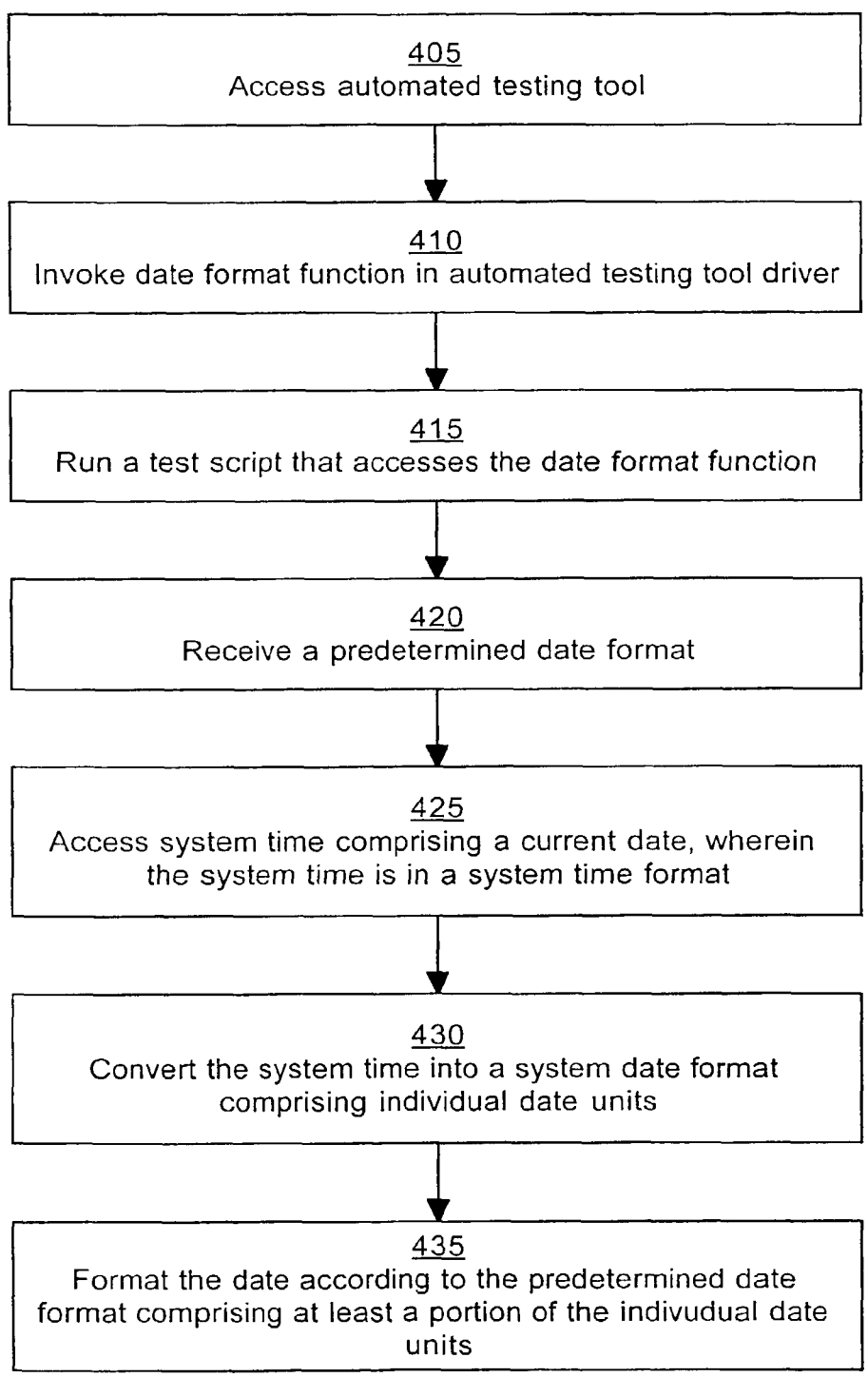

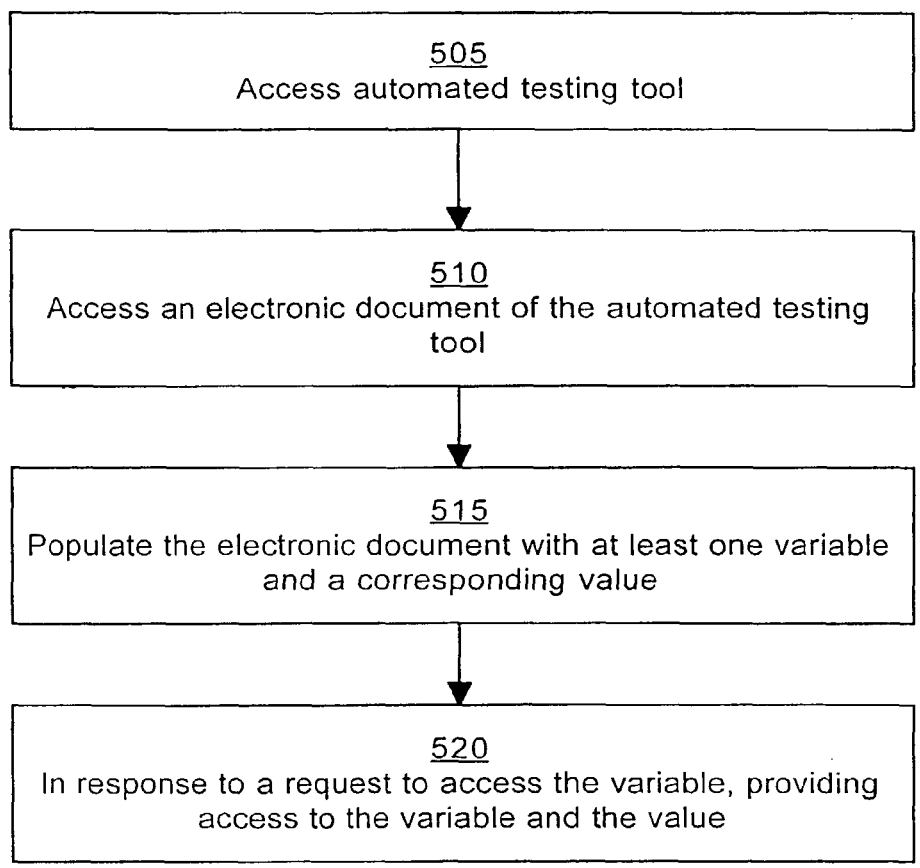

METHOD FOR ENHANCING FUNCTIONALITY OF AN AUTOMATED TESTING TOOL

CROSS-REFERENCE TO RELATED APPLICATION

This application is a divisional of U.S. application Ser. No. 10/466,337, filed May 27, 2003, which is hereby incorporated by reference in its entirety.

FIELD OF INVENTION

Embodiments of the present invention pertain to the field of automated testing tools. More particularly, the present invention relates to a method for enhancing functionality of an automated testing tool.

BACKGROUND OF THE INVENTION

In order to ensure the quality of software applications, quality assurance (e.g., QA) engineers use a variety of tools and procedures. For example, if an application has been modified, QA engineers test the application in order to ensure that additional bugs have not been introduced. Automated testing tools that perform regression testing are typically used to test the quality of a software application. WinRunner, by Mercury Interactive, is an example of an automated testing tool.

Regression testing is a quality control measure to ensure that newly modified code still complies with its specified requirements and that unmodified code has not been affected by any modifications. Regression testing is often used to the selectively retest a software application that has been modified to ensure that any bugs have been fixed. Furthermore, regression testing can be used to ensure that no other previously-working functions have failed as a result of the reparations and that newly added features have not created problems with previous versions of the software.

Automated testing tools typically contain a number of functions and tools for developing and running regression testing. However, current typical automated testing tools do not have date-time functions that are needed to obtain a past date or future date, for testing of software applications requiring time and date sensitive input, such as Oracle's e-business suite of applications. As a result, QA engineers are not able to derive the past and future dates automatically in a typical regression test.

In order to input past and future dates and times, it is typically necessary to use a fixed date mode while running regression tests. However, using a fixed date mode is not suitable for working on central environments. Typical automated testing tools provide a function that provides a current date that is based on the system time. In order to perform regression tests using different dates, it is necessary to alter the system time. Changing the system time on a central environment is rarely, if ever, feasible, due to the use and reliance of connected computers on the system time. For example, different QA engineers may require a different system date at the same time.

To avoid the problems that result from changing the system time in a centralized environment, QA engineers and teams often retain their own individual application environments for performing QA activities. Maintaining an independent environment by each QA team is often very costly, with respect to the cost of maintaining a one or a few central environments for QA teams.

Alternatively, in some situations, QA engineers may change the date and/or time directly in the regression testing script. In order to change dates and times, it is necessary to hard code the specific dates and times into the script. For some applications, such as financial and scheduling applications, a very large number of dates and times may be required. Hard coding these dates and times may require a significant amount of time, at a considerable cost. Furthermore, since the dates are hard coded, in order to run a regression test using different dates, the dates in the script must be replaced with new dates, further increasing the time required to test the quality of an application and to maintain the automated regression tests over time.

Additionally, typical automated testing tools provide the current date and/or time in a default format. Many software applications are used in a wide number of geographic locales having a variety of standard date formats. Often, the standard format of a locale differs from the default format. Currently, regression tests can only present the date in the default format, which may present confusion to the QA engineer. For example, typical automated testing tools present the date in the DD-MM-YYYY format. Where a locale uses the MM-DD-YYYY format, a substantial amount of confusion may be introduced into the testing. Moreover, a software application may require date input to be in a format different to the default format, requiring the hard coding of a date into the testing script at an additional expense.

Furthermore, automated testing tools typically provide the capability to perform a number of regression tests in a batch mode. Regression tests declare various variables for storing and accessing data. Often, regression tests for use in batch mode often pass variables from one regression test to the next such that the regression tests are dependent on each other. QA engineers are either passing the variables from the individual regression tests to the driver or passing the values of the variables from the driver to individual regression tests.

For example, the output of a first regression test may be the input of a second regression test. As such, in order to run the second regression test, it is necessary to run the first regression test. In particular, a later regression test of a batch cannot be run without running an earlier regression test of the batch if there are dependent variables. Moreover, a batch may comprise several regression tests, each dependent on a previous regression test. If the QA engineer only wants to test a later regression test, each regression test prior to the later regression test must be run as well as the values of the dependent variables are only made available in the memory during the session.

As a result, as the values of the variables are in the temporary memory during the session, QA engineers who run a batch of regression tests do not have any idea about the variables made use of in the entire batch included in the driver. Furthermore, variables are typically stored only in temporary memory of the automated testing tool, so that the values represented by the variables are lost when the automated testing tool execution is stopped. In such a situation, the QA engineer will not know the values of the variables for the purpose of querying or using the records already created in the application before the execution of the automated testing tool was stopped.

SUMMARY OF THE INVENTION

Accordingly, a need exists for a method for dynamically adjusting the date for use in a regression test of an automatic testing tool. A need also exists for method for formatting the date for use in a regression test of an automatic testing tool.

Furthermore, a need exists for a method for regulating access to variables in a permanent location for use in a regression test of an automatic testing tool. Moreover, a need exists that satisfies the above needs and is implementable in current automatic testing tools.

A method for enhancing functionality of an automated testing tool is presented. Embodiments of the present invention provide a method for dynamically adjusting a date in an automated testing tool. System time in a system time format is accessed, wherein the system time comprises a current date. In one embodiment, the system time is accessed from a centralized server over a distributed computer network. A date offset characterizing an adjustment of the date is received. The date offset is converted into the system time format. The system time is adjusted according to the date offset.

In one embodiment, the system time is converted into a default date format comprising individual date units. In one embodiment, the individual date units comprise a day, a month and a year. In another embodiment, the individual date units further comprise an hour, a minute and a second.

In one embodiment, the date is formatted according to a predetermined date format comprising at least a portion of the individual date units. In one embodiment, the predetermined date format is received. In one embodiment, the predetermined date format is received in response to user input. In another embodiment, the predetermined date format is a default date format.

Embodiments of the present invention provide a method for regulating access to variables of an automated testing tool. An electronic document of the automated testing tool is accessed. In one embodiment, the electronic document is a spreadsheet.

The electronic document is populated with at least one variable and at least one value corresponding to the variable. In one embodiment, populating the electronic document is performed manually by a user, the user providing the variable and the value. In another embodiment, running a script populates the electronic document. In one embodiment, the script comprises a regression test.

In response to a request to access the variable, access to variable and value is provided. In one embodiment, the request is received from a script. In one embodiment, the script comprises a regression test. In another embodiment, the request is received from a data-driven function.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 illustrates a flowchart showing steps in a process of formatting a date in an automated testing tool in accordance with one embodiment of the present invention.

FIG. 5 illustrates a flowchart showing steps in a process of regulating access to variables in an automated testing tool in accordance with one embodiment of the present invention.

DETAILED DESCRIPTION

Figure 1:
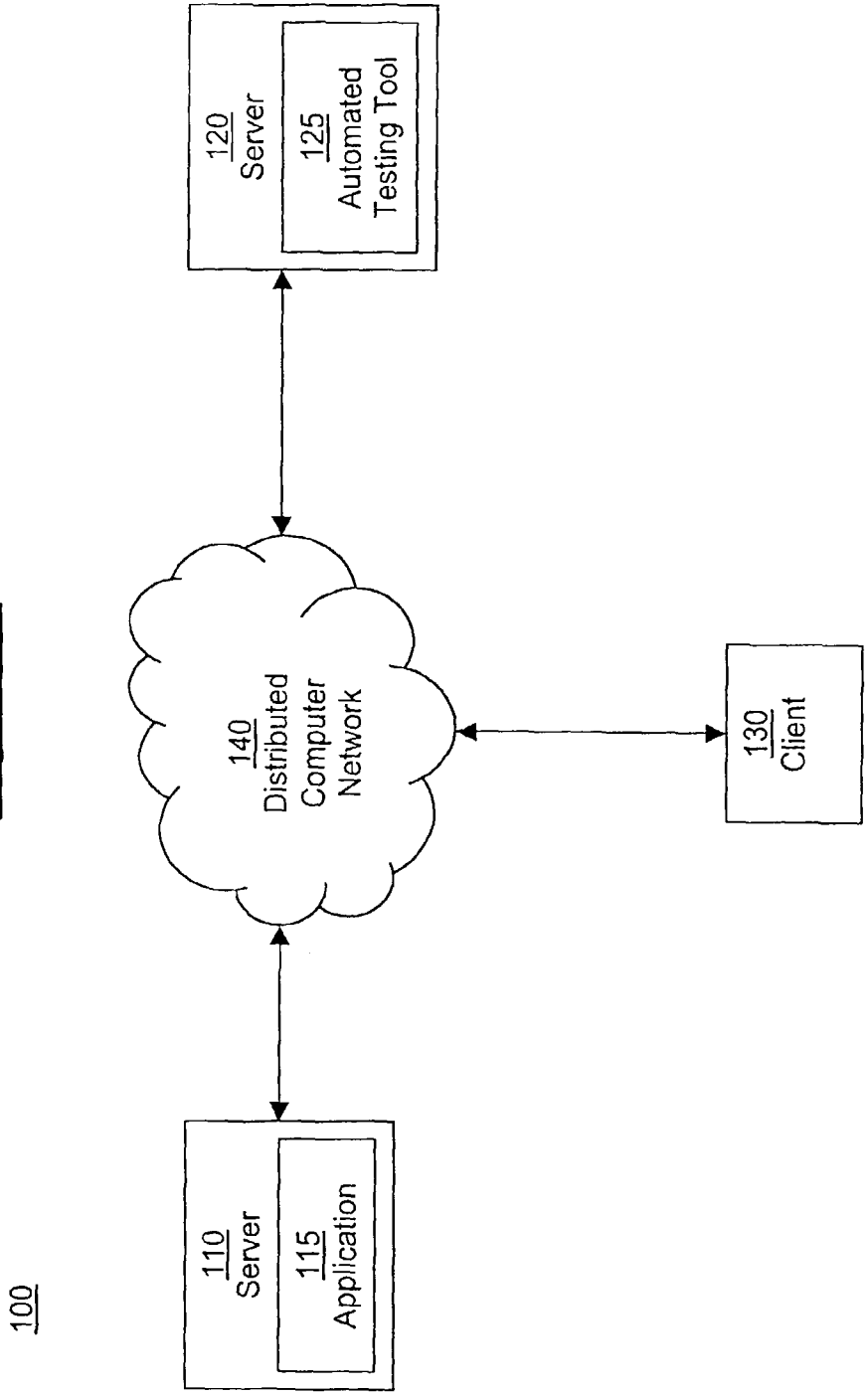
FIG. 1 illustrates a block diagram of an exemplary centralized environment upon which embodiments of the present invention may be implemented.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Embodiments of the present invention provide methods for enhancing functionality of an automated testing tool. In one embodiment, the present invention provides a method for dynamically adjusting a date in an automated testing tool. In another embodiment, the present invention provides a method for formatting a date in an automated testing tool. In another embodiment, the present invention provides a method for regulating access to variables of an automated testing tool.

Notation and Nomenclature

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "accessing" or "receiving" or "converting" or "adjusting" or "formatting" or "populating" or "providing" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Exemplary Hardware Upon which Embodiments of the Present Invention May be Implemented FIG. 1 illustrates a block diagram of an exemplary centralized environment 100 upon which embodiments of the present invention may be implemented. As depicted in FIG. 1, centralized environment 100 includes two servers 110 and 120 communicatively coupled to client 130 via distributed computer network 140.

In one embodiment, application 115 is resident on server 110 and automated testing tool 125 is resident on server 120. Application 115 is a software application that is subject to quality assurance (QA) testing as performed by automated testing tool 125. Automated testing tool 125 is operable to run test scripts on application 115 for testing the quality of application 115.

In one embodiment, automated testing tool 125 and application 115 are accessed from client 130 over distributed computer network 140. A test script defining at least one regression test is run on application 115 through automated testing tool 125. In one embodiment, automated testing tool 125 comprises a driver for running a test script. The driver interacts with and executes application 115. In one embodiment, the test script is received at automated testing tool 125 from client 130. The test script may be stored on server 120.

It should be noted that the embodiment of the present invention depicted in FIG. 1 (e.g., system 100) is implemented as a software based process cooperatively executing on the respective computer system platforms of servers 110 and 120 and client 130. The basic components of the computer system platforms are shown in the example computer system 200 of FIG. 2 below.

Referring still to FIG. 1, distributed computer network 140 includes well know network technologies. For example, distributed computer network 140 can be implemented using LAN technologies (e.g., Ethernet, Tokenring, etc.), the Internet, or other wired or wireless network technologies. The communications links between server 110, server 120, client 130 and distributed computer network 140 can be implemented using, for example, a telephone circuit, communications cable, optical cable, wireless link, or the like.

Figure 2:
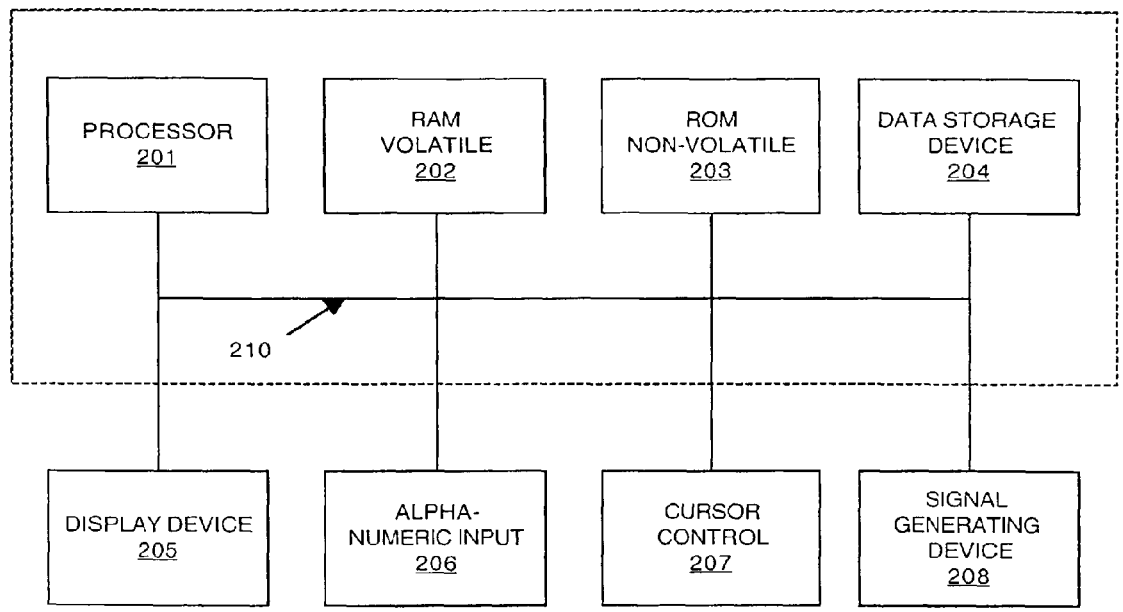
FIG. 2 illustrates a block diagram of an exemplary computer system upon which embodiments of the present invention may be implemented.

Other embodiments of the present invention may be implemented on a single computer system, such as computer system 200 of FIG. 2. In the present embodiment, the automated testing tool and the application are resident on the same computer system. It should be appreciated that embodiments of the present invention may be implemented on any number of servers and clients, and that the automated testing tool and the application to be testing can reside on the same computer system or on separate computer systems.

FIG. 2 illustrates a block diagram of an exemplary computer system 200 upon which embodiments of the present invention may be implemented. Portions of the present invention are comprised of computer-readable and computer executable instructions which reside, for example, in computer-usable media of computer system 200. Computer system 200 shows the components of a computer system in accordance with one embodiment of the present invention that provides the execution platform for implementing certain software-based functionality of the present invention. As described above, certain processes and steps of the present invention are realized, in one embodiment, as a series of instructions (e.g., software program) that reside within computer readable memory units of a computer system (e.g., system 200) and are executed by the processor(s) of system 200. When executed, the instructions cause the computer system 200 to implement the functionality of the present invention as described above.

In general, computer system 200 shows the basic components of a computer system used to implement "server" machines and "client" machines. Computer system 200 comprises an address/data bus 210 for communicating information, one or more central processors 201 coupled with the bus 210 for processing information and instructions, a computer readable volatile memory unit 202 (e.g., random access memory, static RAM, dynamic, RAM, etc.) coupled with the bus 210 for storing information and instructions for the central processor(s) 201, a computer readable non-volatile memory unit 203 (e.g., read only memory, programmable ROM, flash memory, EPROM, EEPROM, etc.) coupled with the bus 210 for storing static information and instructions for the processor(s) 201. System 200 also includes a computer readable data storage device 204 such as a magnetic or optical disk and disk drive coupled with the bus 210 for storing information and instructions. Optionally, system 200 can include a display device 205 coupled to the bus 210 for displaying information to the computer user, an alphanumeric input device 206 including alphanumeric and function keys coupled to the bus 210 for communicating information and command selections to the central processor(s) 201, a cursor control device 207 coupled to the bus for communicating user input information and command selections to the central processor(s) 201, and a signal generating device 208 coupled to the bus 210 for communicating command selections to the processor(s) 201.

Figure 3:
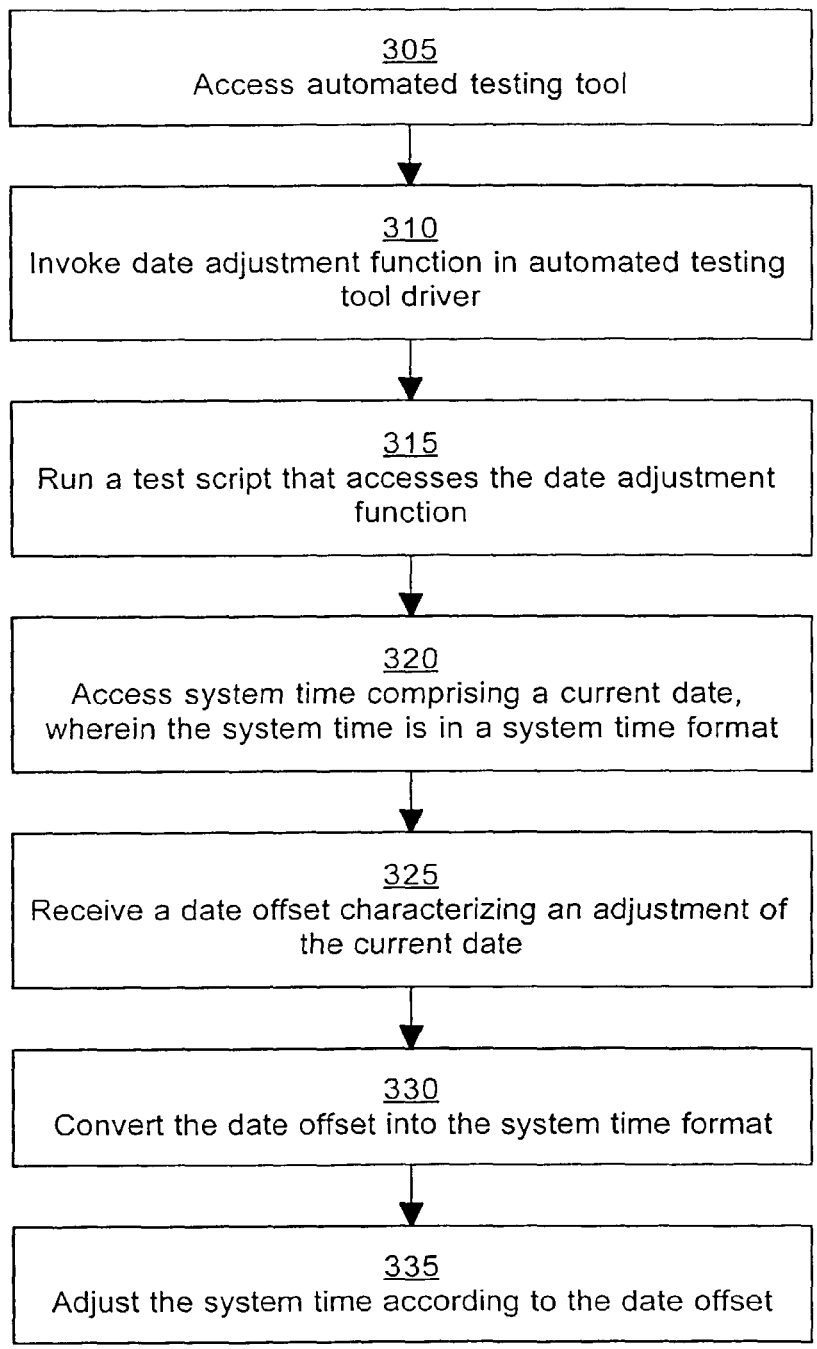
FIG. 3 illustrates a flowchart showing steps in a process of dynamically adjusting a date in an automated testing tool in accordance with one embodiment of the present invention.

A Method for Dynamically Adjusting and Formatting a Date in an Automated Testing Tool FIG. 3 illustrates a flowchart showing steps in a process 300 for dynamically adjusting a date in an automated testing tool in accordance with one embodiment of the present invention. In one embodiment, process 300 is carried out by processors and electrical components (e.g., computer system 200 of FIG. 2) under the control of computer readable and computer executable instructions. Although specific steps are disclosed in process 300, such steps are exemplary. That is, the embodiments of the present invention are well suited to performing various other steps or variations of the steps recited in FIG. 3.

At step 305 of FIG. 3, an automated testing tool is accessed. The automated testing tool is operable to implement test scripts (e.g., regression tests) to test the quality of a software application. An automated testing tool comprises a driver for running functions and test scripts associated with the QA testing.

At step 310, a date adjustment function is invoked in the driver. In one embodiment, the date adjustment function is invoked in a test script. Invoking the date adjustment function in the driver provides for the date adjustment function to be accessible for all test scripts that are run in one session. In one embodiment, a session ends when the automated testing tool is shut down. At step 315, a test script is run. In one embodiment, the test script accesses the date adjustment function.

At step 320, the system time is accessed. In one embodiment, the automated testing tool comprises a function for accessing the system time. The system time is in a system time format and comprises a current date. In one embodiment, the system time format presents the system time as a number indicating the number of seconds that have elapsed since 12:00 AM Jan. 1, 1970.

At step 325, a date offset is received, wherein the date offset characterizes an adjustment of the current date. The date offset is comprised within the test script. In one embodiment, the date offset is formatted to indicate the number of days to add or subtract. It should be appreciated that the date offset may be formatted in any manner, such as months and years to add or subtract, and is not limited to the present embodiment. For example, a test script is run on Sep. 30, 2003. A QA engineer indicates an adjustment of minus fifteen days (e.g., −15), corresponding to Sep. 15, 2003. Alternatively, the QA engineer indicates an adjustment of positive fifteen days (e.g., 15), corresponding to Oct. 15, 2003.

At step 330, a converted date offset is generated by converting the date offset into the system time format. For example, where the system time format is the number of seconds that have elapsed since 12:00 AM Jan. 1, 1970, the date offset is converted into seconds. If the date offset is −15, the date offset in the system time format is −1296000, as shown at Equation 1:

$$(-15 \text{ days}) * \left(\frac{24 \text{ hours}}{1 \text{ day}}\right) * \left(\frac{60 \text{ minutes}}{1 \text{ hour}}\right) * \left(\frac{60 \text{ seconds}}{1 \text{ minute}}\right) = -1296000 \quad \text{Equation 1}$$

Similarly, if the date offset is 30, the date offset in system time is 2592000, as shown at Equation 2:

$$(30 \text{ days}) * \left(\frac{24 \text{ hours}}{1 \text{ day}}\right) * \left(\frac{60 \text{ minutes}}{1 \text{ hour}}\right) * \left(\frac{60 \text{ seconds}}{1 \text{ minute}}\right) = 2592000 \quad \text{Equation 2}$$

At step 335, the system time is adjusted according to the converted date offset resulting in an adjusted date. By converting the date offset to the system time format, the date offset is added to the system time (e.g., current date) to generate the adjusted date. It should be appreciated that the date offset may have a positive value (e.g., a later date) or a negative value (e.g., an earlier date). Therefore, adding a negative value has the effect of reducing the system time, resulting in an earlier adjusted date.

Embodiments of the present invention provide a method for dynamically calculate past and future dates while performing test scripts (e.g., regression tests) using an automated testing tool to test software applications. Furthermore, embodiments of the present invention provides the ability to perform automated testing in a current date mode on central environments, rather than limiting automated testing to a fixed date mode on individual environments. As such, embodiments of the present invention do not require individual testing environments, eliminating the need to maintain several individual testing environments, at a substantial cost savings.

Furthermore, embodiments of the present invention provide for formatting the date according to user preferences. FIG. 4 illustrates a flowchart showing steps in a process 400 for formatting a date in an automated testing tool in accordance with one embodiment of the present invention. In one embodiment, the adjusted date as generated at step 335 is formatted. In one embodiment, process 400 is carried out by processors and electrical components (e.g., computer system 200 of FIG. 2) under the control of computer readable and computer executable instructions. Although specific steps are disclosed in process 400, such steps are exemplary. That is, the embodiments of the present invention are well suited to performing various other steps or variations of the steps recited in FIG. 4.

At step 405 of FIG. 4, an automated testing tool is accessed. The automated testing tool is operable to implement test scripts (e.g., regression tests) to test the quality of a software application. An automated testing tool comprises a driver for running functions and test scripts associated with the QA testing.

At step 410, a date format function is invoked in the driver. In one embodiment, the date format function is invoked in a test script. Invoking the date format function in the driver provides for the date format function to be accessible for all test scripts that are run in one session. In one embodiment, a session ends when the automated testing tool is shut down. At step 415, a test script is run. In one embodiment, the test script accesses the date format function.

At step 420, a predetermined date format is received. In one embodiment, the predetermined date format is a default date format. In the present embodiment, provided a predetermined date format is not directly received, the default date format is used for formatting the date. In one embodiment, the default date format is DD-MON-YYYY, where DD indicates the day in two digits (e.g., 02 or 17), MON indicates the month using the first three letters of the month (e.g., JAN or NOV), and YYYY indicates the year (e.g., 1973 and 2002).

In another embodiment the predetermined date format is received in response to user input. In one embodiment, the predetermined date format is comprised within a test script. It should be appreciated that any format for identifying a date may be used. For example, the predetermined format may be DD/MM/YY, where DD indicates the day in two digits, MM indicates the month in two digits (e.g., 01 or 12), and YY indicates the year in two digits (e.g., 73 or 02).

At step 425, the system time is accessed. In one embodiment, the automated testing tool comprises a function for accessing the system time. The system time is in a system time format and comprises a current date. In one embodiment, the system time format presents the system time as a number indicating the number of seconds that have elapsed since 12:00 AM Jan. 1, 1970.

At step 430, the system time is converted into a default date format comprising individual date units. In another embodiment, the adjusted time as generated at step 335 of FIG. 3 is converted into a default date format comprising individual date units. In one embodiment, the automated testing tool comprises a function for converting system time into a system date format. In one embodiment, the system date format is DD-MM-YYYY, where DD represents the day using two digits, MM represents the month using two digits, and YYYY represents the year using four digits. In another embodiment, the system date format is DD-MM-YYYY-hh-mm-ss, where DD represents the day using two digits, MM represents the month using two digits, YYYY represents the year using four digits, hh represents the hour using two digits, mm represents the minute using two digits, and ss represents the seconds using two digits.

At step 435, the date is formatted according to the predetermined date format. The date comprises at least a portion of the individual date formats. For example, the predetermined date format may be DD/MM or MM/YYYY. Furthermore, the individual date units may be converted to fit the predetermined date format. For example, where the predetermined date format is DD-MON-YYYY, the day and year from the system time are used directly, and the month is converted from two digits into the first three letters of the month.

Embodiments of the present invention provide a method to extract the date, the month, the year and the time in terms of hours, minutes and seconds from the system time. As the system time is split into the six individual atomic components dynamically, these components can be used in any order specified by the user with or without embedding a separator such as a hyphen (e.g., "-"), a dash (e.g., "/"), or a period (e.g., ".") in between any or all of the atomic components of the system time. As the three digit month (e.g., JAN, FEB, or MAR) is equated to corresponding 2 digit month (e.g., 01, 02, or 03), a user is able to obtain either three digit and two digit representations of the month to obtain the desired date format.

Embodiments of the present invention provide a method for formatting dates using an automated testing tool to test software applications. As such, dates need not be hard coded into a test script, reducing the time and cost required for generating and maintaining test scripts.

A Method of Regulating Access to Variables of an Automated Testing Tool

Embodiments of the present invention provide a method of regulating access to variables for use in the development and replay of test scripts using an automated testing tool. This present invention enables storing of all the public variables and database connection information applicable to any batch of test scripts included in any driver in a common place (e.g., a clipboard) in the form of a spreadsheet. The names and the values of the public variables included in the clipboard can be utilized by any individual test script in the batch, regardless of whether the test scripts are run through the driver or not.

FIG. 5 illustrates a flowchart showing steps in a process 500 for regulating access to variables in an automated testing tool in accordance with one embodiment of the present invention. In one embodiment, process 500 is carried out by processors and electrical components (e.g., computer system 200 of FIG. 2) under the control of computer readable and computer executable instructions. Although specific steps are disclosed in process 500, such steps are exemplary. That is, the embodiments of the present invention are well suited to performing various other steps or variations of the steps recited in FIG. 5.

At step 505 of process 500, an automated testing tool is accessed. At step 510 of process 500, an electronic document (e.g., clipboard) of an automated testing tool is accessed. In one embodiment, running a test script accesses the electronic document. In one embodiment, the test script comprises a regression test. In another embodiment, the electronic document is accessed directly. In one embodiment, the electronic document is a spreadsheet.

At step 515 populating said electronic document with at least one variable and at least one value, wherein the value corresponds to the variable. In one embodiment, populating said electronic document is performed manually by a user, wherein the user provides a variable and corresponding value. In another embodiment, populating the electronic document comprises running a test script. When populating the electronic document by running a test script, a new entry for a variable and corresponding value are automatically generated. When populating a spreadsheet, it should be appreciated that a variable and its corresponding value may be stored in either columns of a spreadsheet or rows of a spreadsheet. The electronic document can initially be a blank spreadsheet with no columns or rows, as columns or rows are dynamically created if they do not already exist in the excel table The electronic document operates in read-write mode for permanently storing the values of variables used in by the automated testing tool. It should be appreciated that the variables may be declared public or private. For populating a spreadsheet, it should be appreciated that any individual test script can create a variable and include it into the electronic document. Further, any individual test script can update the existing value of any variable included in the electronic document. Thus, the electronic document can serve as storage for storing values of various variables used in any batch of test scripts. Since the electronic document is not residing in the session as temporary memory, any test script can access just the electronic document. For instance, where the electronic document is a spreadsheet, a test script is in a position to read from or write into any cell of the spreadsheet. Thus, all the variables used in a batch of test scripts can be stored in the spreadsheet permanently and can be accessed or updated by any of the test scripts independently without reference to any previous or other test script.

In one embodiment, the electronic document can be utilized to store values for all the variables used in a batch of regression tests, including information dynamically captured from the operating system or from the driver about the system time and date of the execution, the future and past dates, as described in FIGS. 3 and 4. Further, the electronic document may also dynamically capture the URLs invoked by test script, and the database connection and login information used by the user, while starting a driver to run a batch of regression tests.

At step 520, in response to a request to access a variable, access is provided to the variable and the corresponding value. In one embodiment, the request is received from a test script. In one embodiment, the test script comprises a regression test. In another embodiment, the request is received from a data-driven function.

The electronic document provides access to the values of the variables used in a batch of regression tests. In one embodiment, the variables are accessible by other regression tests of the batch. In another embodiment, regression tests of another batch may access the variables. Regression test batches are often used by different QA engineers or teams located in different locations. Thus, providing access to variables and values in a single location aids QA engineers and teams in knowing the various pre-requisite values required by regression tests to run them successfully.

Embodiments of the present invention provide an electronic document for storing the variables used in a batch of regression tests at a single location. The present invention eliminates the practice of passing on the values of the variables back and forth from the test script and driver, thus reducing the time associated with running a regression test. The electronic document provides an efficient and easy to use way of sharing values of the variables within a batch of test scripts. The electronic document provides a facility for a batch of regression tests to use a common place to store values and update the values as the regression tests are executed through the driver. Furthermore, the electronic document is manually updateable, providing additional flexibility when performing a regression test.

The preferred embodiment of the present invention, a method for enhancing functionality of an automated testing tool, is thus described. While the present invention has been described in particular embodiments, it should be appreciated that the present invention should not be construed as limited by such embodiments, but rather construed according to the below claims.

What is claimed is:

1. A method of regulating access to variables of an automated testing tool, said method comprising:
- initiating said automated testing tool on a computer system;
- accessing an electronic document of said automated testing tool;
- populating said electronic document with at least one variable and at least one value used during execution of a first test script by the computer system, said value corresponding to said variable;
- in response to a request to access said variable during execution of a second test script by the computer system, retrieving said value of said variable from said electronic document and providing access to said variable and said retrieved value such that passing of said value between test scripts in a batch of test scripts or between batches of test scripts is reduced; and
- in response to a request to update said variable to have a second value during execution of the second test script by the computer system, storing said second value in said electronic document in association with said variable.

2. The method as recited in claim 1 wherein said electronic document is a spreadsheet.

3. The method as recited in claim 1 wherein said populating said electronic document is performed manually by a user, said user providing said variable and said value.

4. The method as recited in claim 1 wherein said populating said electronic document comprises running the first test script.

5. The method as recited in claim 1 wherein said request is received from the second test script.

6. The method as recited in claim 1 wherein said request is received from a data-driven function.

7. A non-transitory computer-readable medium having computer-readable program code embodied therein for causing a computer system to perform a method of regulating access to variables of an automated testing tool, said method comprising:
- initiating said automated testing tool on the computer system;
- accessing an electronic document of said automated testing tool;
- populating said electronic document with at least one variable and at least one value used during execution of a first test script by the computer system, said value corresponding to said variable;
- in response to a request to access said variable during execution of a second test script by the computer system, retrieving said value of said variable from said electronic document and providing access to said variable and said retrieved value such that passing of said value between test scripts in a batch of test scripts or between batches of test scripts is reduced; and
- in response to a request to update said variable to have a second value during execution of the second test script by the computer system, storing said second value in said electronic document in association with said variable.

8. The computer-readable medium as recited in claim 7 wherein said electronic document is a spreadsheet.

9. The computer-readable medium as recited in claim 7 wherein said populating said electronic document is performed manually by a user, said user providing said variable and said value.

10. The computer-readable medium as recited in claim 7 wherein said populating said electronic document comprises running the second test script.

11. The computer-readable medium as recited in claim 7 wherein said request is received from the second test script.

12. The computer-readable medium as recited in claim 7 wherein said request is received from a data-driven function.

* * * * *

UNITED STATES PATENT AND TRADEMARK OFFICE
CERTIFICATE OF CORRECTION

| | | |
|---|---|---|
| PATENT NO. | : 8,434,065 B2 | Page 1 of 1 |
| APPLICATION NO. | : 12/372938 | |
| DATED | : April 30, 2013 | |
| INVENTOR(S) | : Voruganti | |

It is certified that error appears in the above-identified patent and that said Letters Patent is hereby corrected as shown below:

On the Title page, in Item [75], delete "Vorungati" and insert -- Voruganti --, therefor.

In the Drawings

On Drawing sheet 4 of 5, in figure 4, Reference Numeral 435, line 2, delete "indivudual" and insert -- individual --, therefor.

In the Specification

In column 10, line 2, after "table" insert -- . --.

Signed and Sealed this
Third Day of September, 2013

Teresa Stanek Rea
*Acting Director of the United States Patent and Trademark Office*